(12) United States Patent
Meier et al.

(10) Patent No.: US 7,753,997 B2
(45) Date of Patent: Jul. 13, 2010

(54) CLEANING DEVICE FOR CLEANING PROCESS GAS OF A REFLOW SOLDERING SYSTEM

(75) Inventors: Hartmut Meier, Bernau (DE); Bernd Müller, Falkenberg (DE); Ulrich Wittreich, Velten (DE)

(73) Assignee: Rehm Thermal Systems GmbH, Blaubeuren-Seissen (DE)

( * ) Notice: Subject to any disclaimer, the term of this patent is extended or adjusted under 35 U.S.C. 154(b) by 1242 days.

(21) Appl. No.: 10/529,765

(22) PCT Filed: Sep. 26, 2003

(86) PCT No.: PCT/DE03/03311

§ 371 (c)(1),
(2), (4) Date: Nov. 3, 2005

(87) PCT Pub. No.: WO2004/030855

PCT Pub. Date: Apr. 15, 2004

(65) Prior Publication Data

US 2006/0107838 A1    May 25, 2006

(30) Foreign Application Priority Data

Sep. 30, 2002    (DE) ................................. 102 46 540

(51) Int. Cl.
*B01D 47/00*    (2006.01)

(52) U.S. Cl. ........................ 96/269; 55/385.1; 96/272; 96/276; 96/279

(58) Field of Classification Search ................ 55/385.1, 55/385.6, 410.1, 418.1, 467.1, 351.1; 34/77, 34/79; 228/42, 37, 222, 223, 46, 200, 219; 75/336, 338; 210/806, 690, 692, 693; 95/270–274, 95/288, 277, 290, 296, 297, 299, 322, 325, 95/327, 328, 216, 210, 211; 96/377, 414, 96/420, 421, 267, 269, 271, 272, 276, 277, 96/278, 279, 299, 322, 325, 327, 328, 329, 96/351–354; 261/112.1, 104
See application file for complete search history.

(56) References Cited

U.S. PATENT DOCUMENTS 1,936,078 A * 11/1933 Adamson ..................... 95/133
(Continued)

FOREIGN PATENT DOCUMENTS

| CN | 2348917 Y | 11/1999 |
|---|---|---|
| EP | 0 898 443 A1 | 2/1999 |

OTHER PUBLICATIONS

International Search Report for International Patent Appl. No. PCT/DE2003/003311, mailed Mar. 11, 2004.
(Continued)

*Primary Examiner*—Duane Smith
*Assistant Examiner*—Minh-Chau T Pham
(74) *Attorney, Agent, or Firm*—Sterne, Kessler, Goldstein & Fox P.L.L.C.

(57) ABSTRACT

The present invention is directed to a cleaning device for process gases of a reflow soldering system that includes a plurality of cleaning chambers. The plurality of cleaning chambers contain a cleaning liquid for the process gas, where each of the cleaning chambers is adapted to be flown through via a supply line for the contaminated process gas and via a discharge line for the cleaned gas. The cleaning chambers also include a plurality of cleaning walls along which the cleaning liquid is flown for take-up of impurities in the process gas into the cleaning liquid. A plurality of the deposition walls is provided, where at least one of the deposition walls also forms an outer wall of the cleaning device.

15 Claims, 3 Drawing Sheets

U.S. PATENT DOCUMENTS

| | | | | |
|---|---|---|---|---|
| 2,802,543 | A * | 8/1957 | Clark | 96/232 |
| 2,947,383 | A * | 8/1960 | Schytil et al. | 95/268 |
| 3,246,452 | A * | 4/1966 | Arvanitakis | 96/242 |
| 3,266,224 | A * | 8/1966 | Ferretti | 96/326 |
| 3,993,448 | A * | 11/1976 | Lowery, Sr. | 422/169 |
| 4,497,641 | A * | 2/1985 | Brown et al. | 95/225 |
| 4,588,535 | A * | 5/1986 | Foidl | 261/22 |
| 4,609,386 | A * | 9/1986 | Sibley et al. | 96/257 |
| 4,775,499 | A * | 10/1988 | Hongo et al. | 261/106 |
| 4,912,857 | A * | 4/1990 | Parent et al. | 34/611 |
| 4,951,401 | A * | 8/1990 | Suzuki et al. | 34/77 |
| 5,037,454 | A * | 8/1991 | Mann | 95/126 |
| 5,524,812 | A | 6/1996 | Taniguchi et al. | |
| 5,535,989 | A * | 7/1996 | Sen | 261/112.1 |
| 5,573,688 | A * | 11/1996 | Chanasyk et al. | 219/388 |
| 5,611,476 | A * | 3/1997 | Soderlund et al. | 228/42 |
| 5,623,829 | A * | 4/1997 | Nutter et al. | 62/5 |
| 5,641,341 | A * | 6/1997 | Heller et al. | 95/287 |
| 5,776,354 | A * | 7/1998 | van der Meer et al. | 210/806 |
| 5,833,888 | A * | 11/1998 | Arya et al. | 261/112.1 |
| 5,993,500 | A * | 11/1999 | Bailey et al. | 55/385.6 |
| 6,120,585 | A * | 9/2000 | Inomata et al. | 96/377 |
| 6,245,133 | B1 * | 6/2001 | Bourgeois | 96/414 |
| 6,267,804 | B1 * | 7/2001 | Marlowe | 96/237 |
| 6,293,526 | B1 * | 9/2001 | Fischer et al. | 261/97 |
| 6,325,361 | B1 * | 12/2001 | Van Duijn | 261/113 |
| 6,575,437 | B2 * | 6/2003 | Fischer et al. | 261/97 |
| 6,635,101 | B2 * | 10/2003 | Minogue | 75/338 |
| 6,706,097 | B2 * | 3/2004 | Zornes | 96/153 |
| 6,749,655 | B2 * | 6/2004 | Dautenhahn | 55/385.1 |
| 6,908,512 | B2 * | 6/2005 | Ivanov et al. | 118/503 |
| 7,334,630 | B2 * | 2/2008 | Goodson et al. | 165/104.33 |
| 7,431,805 | B2 * | 10/2008 | Beckman | 203/2 |
| 2002/0108497 | A1 * | 8/2002 | Wong | 96/240 |
| 2003/0085476 | A1 * | 5/2003 | Kinney et al. | 261/109 |
| 2005/0097990 | A1 * | 5/2005 | Minogue | 75/338 |

OTHER PUBLICATIONS

English version of first Chinese Office Action issued on Feb. 2, 2007 in counterpart Chinese Application No. 03825075.6.

* cited by examiner

CLEANING DEVICE FOR CLEANING PROCESS GAS OF A REFLOW SOLDERING SYSTEM

BACKGROUND

The present invention relates to a cleaning device for process gases particularly of a reflow soldering system, the device comprising a plurality of cleaning chambers containing a cleaning liquid for the process gas, each of the cleaning chambers being adapted to be flown through via a supply line for the contaminated process gas and a discharge line for the cleaned process gas.

Cleaning devices for reflow soldering gases are e.g. known from the US patent provided with U.S. Pat. No. 4,951,401. Said cleaning devices comprise a channel with the help of which the process gas is taken from the reflow soldering system and supplied again to the system after having been cleaned by means of a filter. Impurities deriving from the process gas are retained by the filter, which can be replaced or washed as soon as its absorbing capacity has been exhausted. A further cleaning device for process gases of a reflow soldering system is described in JP 59-029020 A. In this system, the process gas is passed through a cleaning liquid.

A cleaning device for exhaust gases issuing from combustion processes is described in DE 37 27 2943 A1. Said device comprises a tubular housing which can be divided by so-called gas distributor plates into several deposition chambers for the process gas. The number of the employed gas distribution plates depends on the length of the tubular housing.

SUMMARY

It is the object of the present invention to provide a cleaning device for the process gas particularly of a reflow soldering system with the help of which a comparatively efficient cleaning of the process gas can be effected independently of the general conditions set by the system.

According to the invention this object is achieved in that the cleaning chambers are each formed by modules of which such a great number is arranged to be flown through in parallel that the required throughput of process gas is achieved, and of which such a great number is arranged to be flown through one after the other that the required degree of purity is achieved for the process gas. The impurities issuing from the process gas can be discharged to the cleaning liquid by contacting the process gas with the cleaning liquid. In this process, the cleaning device can advantageously be adapted to the required deposition performance in an optimum way in that the modules are connected in parallel in response to the required throughput of process gas and in series in response to the required residual content of impurities. It is particularly possible to connect modules of different operative principles in series to be able to achieve the required degree of deposition and to filter, for instance, impurities with different properties in an optimum way. The individual modules employed can be configured to have a simple construction and a small constructional size, so that e.g. with the help of plug-type connections it is easily possible to create cleaning devices offering the possibility of a finely graded capacity adaptation.

A further advantage is that the enhancement of the deposition performance is not limited by a rise in the loss of pressure produced by the cleaning device.

An additional advantage in the use of cleaning liquid is due to the fact that said liquid can be exchanged without the process sequence of the reflow soldering system being stopped. The removed and contaminated cleaning liquid can here be replaced by a clean cleaning liquid at the same time. Since standstill times of the reflow soldering system are avoided, profitability during operation of a reflow soldering system provided with the cleaning device according to the invention can advantageously be enhanced.

It is advantageous when modules with different operative principles are arranged one after the other in series during deposition. In this case, it is e.g. possible to employ, first of all, an operative principle with a high absorption capacity with respect to impurities, whereby the process gas can first be freed within a short period of time from the majority of impurities. Subsequently, an operative principle may e.g. be employed with a high performance with respect to the attainable residual concentration, so that a high degree of purity of the cleaned process gas can be set.

According to a variant of the invention a flow path for the cleaning liquid extends through the series-connected modules such that the direction of flow of the cleaning liquid is opposite to the direction of flow of the process gas. This advantageously improves the deposition performance of the cleaning device of the invention through realization of a counter-current principle.

According to a further variant of the module-like construction, cleaning liquids with different cleaning properties may be provided in the cleaning chambers of the parallel-connected modules. It is thereby possible to select different cleaning liquids, each being advantageously adapted in an optimum way to different substances to be separated. Optimum cleaning results can respectively be achieved with said cleaning liquids. When different cleaning liquids are used, it is particularly advantageous to series-connect the modules with respect to the process gas to be cleaned because the process gas will then pass in one cycle through all of the different cleaning liquids.

According to a further variant of the invention, the cleaning chamber contains a bath consisting of the cleaning liquid, the supply line terminating below the liquid level of the bath in said bath. It is thereby possible in an advantageous way to pass the process gas in the form of bubbles through the bath, whereby the surface is enlarged that is available for discharging the impurities from the process gas to the cleaning liquid. At the same time the construction of said cleaning means is very simple, whereby an inexpensive production is made possible in an advantageous way.

According to another variant of the invention the cleaning chamber comprises at least one deposition wall on the surface of which a film of the cleaning liquid is provided. An exactly defined deposition surface can thereby be formed in an advantageous way, the deposition surface being defined by the surface of the cleaning-liquid film formed on the deposition wall.

It is advantageous when the deposition wall is arranged perpendicular or with a slope in the cleaning chamber and when in the area of a top deposition-wall edge which is obtained due to said arrangement, a supply means for the cleaning liquid is arranged that is directed thereto. This has the effect that the cleaning liquid flows, starting from the top edge of the deposition wall in the manner of a waterfall and in conformity with gravity, downwards along said wall, and the cleaning liquid can thus be replaced without any problems.

According to another variant of the invention, at least one injection opening for the cleaning liquid is directed into the cleaning chamber. The cleaning liquid can be distributed by means of preferably a plurality of injection openings in the cleaning chamber, whereby a mixture is formed with the process gas to be cleaned. Advantageously, the surface which is available for absorbing impurities in the cleaning fluid is thereby enlarged. For instance, a liquid curtain can be formed through which the process gas is passed. The injection openings, however, may also be configured in the form of nozzles, so that a liquid mist can be produced in the cleaning chamber.

A further variant of the invention is characterized by a combination of several modules, each containing a cleaning chamber, in such a manner that a process gas can flow through all of the cleaning chambers. It is here possible to achieve the combination, on the one hand, as a parallel connection of a plurality of modules, whereby the capacity of the cleaning device can advantageously be adapted to different reflow soldering systems. The constructional efforts are here small and the reduction of individual components has an advantageous effect on storage in the marketing of the cleaning device. Another possibility is provided by the series-connection of modules, whereby the cleaning device can be modified with respect to the quality of the deposition result. Particularly modules with different operative principles, e.g. the modules already described above, can be connected one after the other, so that the advantages of the individual operative principles can be combined with one another.

Advantageously, the cleaning chamber may comprise an outlet which is connected to a clarifying device for the cleaning liquid. The clarifying device may e.g. consist of a clarifying tank in which the impurities introduced into the cleaning liquid can settle as sludge. This sludge can then be disposed off easily while the clarified cleaning liquid can be returned again to the cleaning process. This offers the possibility of using the cleaning liquid repeatedly, whereby profitability during operation of the cleaning device can be further enhanced in an advantageous manner.

BRIEF DESCRIPTION OF THE DRAWINGS

Further details of the invention shall now be described in the following with reference to the drawing, in which.

DETAILED DESCRIPTION

Figure 1:
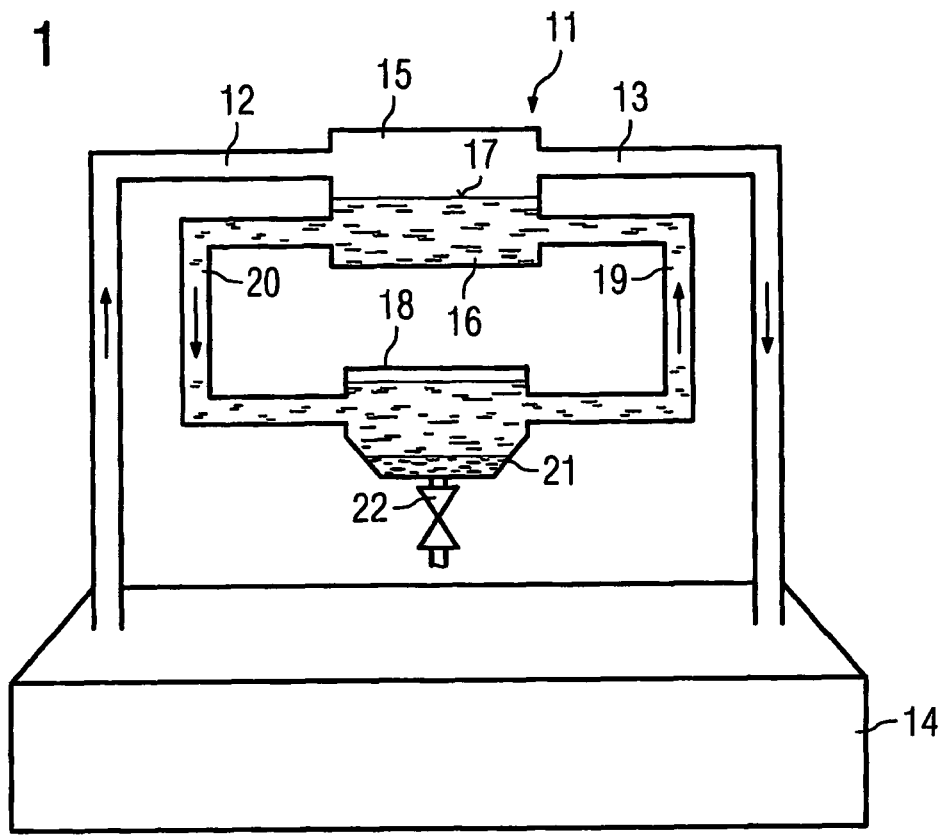
FIG. 1 shows one possibility of connecting a cleaning device to a reflow soldering system, in a schematic section.

FIG. 1 shows a cleaning device 11 which is connected via a supply line 12 and a discharge line 13 to a reflow soldering system 14 in such a manner that the process gas contained in the reflow soldering system is supplied to the cleaning device in the manner as outlined by arrows and can be returned into the reflow soldering system 14 after the cleaning process has been carried out, resulting in a circulatory flow for the process gas. The cleaning device includes a cleaning chamber 15 which is partly filled with a cleaning liquid 16. At an interface 17 between the cleaning liquid 16 and the process gas contained in the cleaning chamber 15, impurities are exchanged from the process gas into the cleaning liquid.

With a clarifying device 18 in the form of a clarifying tank, the cleaning liquid 16 forms a circulatory flow which is completed via a supply 19 to the cleaning device and via an outlet 20 away from the cleaning device. In the clarifying device 18, the impurities transferred from the process gas into the cleaning liquid 16 settle down as sludge 21. The sludge can be removed via an outlet valve 22 from the clarifying device.

Inert liquids such as water or oils may e.g. be used as cleaning liquids, said liquids being non-reactive with constituents of the process gas. Of particular advantage is the use of so-called perfluoropolyethers, which are soluble neither in water nor in oil and are characterized by a high resistance to reactive chemicals.

Further embodiments of cleaning means shall be explained in the following; components which are configured in accordance with the embodiment shown in FIG. 1 are provided with the same reference numerals and shall not be explained in more detail.

Figure 2:
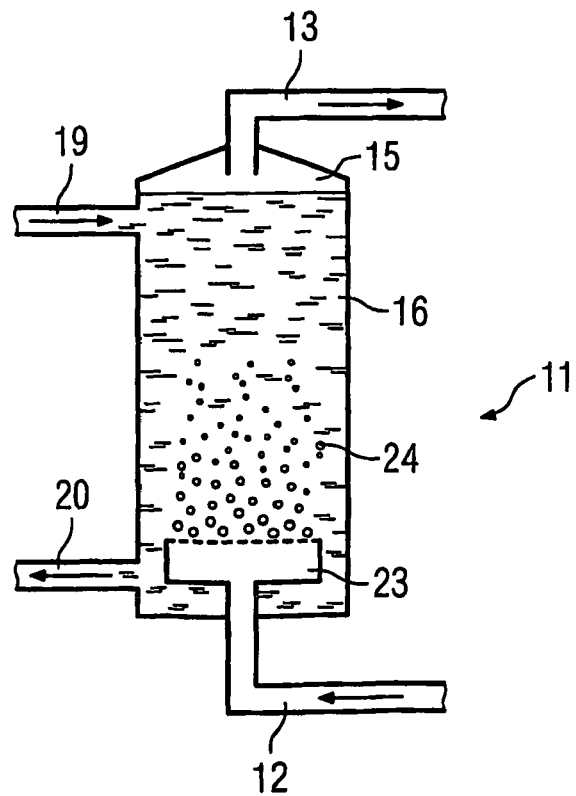
FIGS. 2 to 4 shows possible operative principles for cleaning devices with a cleaning liquid, in a schematic section.

The cleaning device 11 according to FIG. 2 is of a cylindrical configuration and is predominantly filled with the cleaning liquid 16. The cleaning liquid is continuously exchanged via inlet 19 and outlet 20.

The process gas is supplied via the supply line 12 and a distributor 23 below the liquid level of the cleaning liquid 16, so that the process gas can be cleaned while rising upwards in small bubbles 23 in the cleaning liquid.

Figure 3:
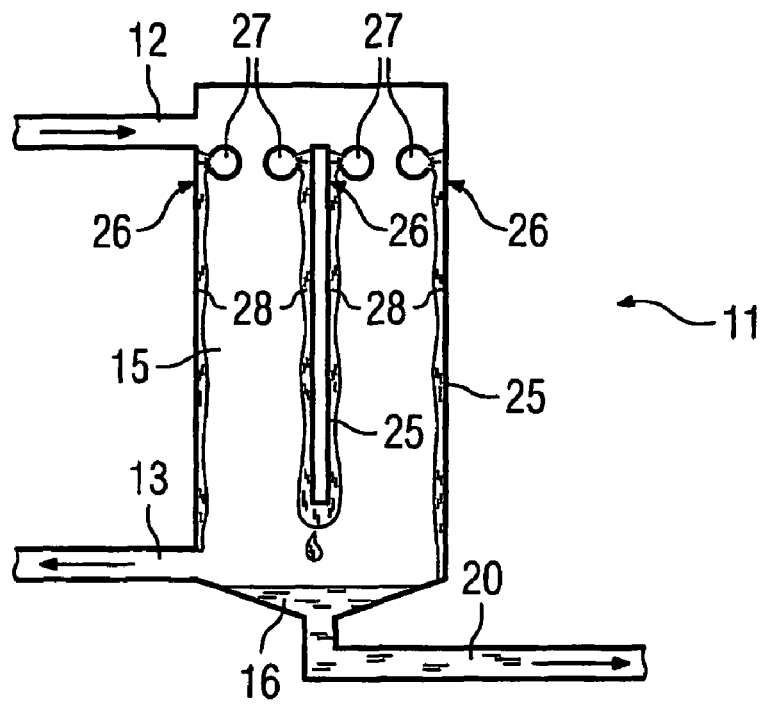

Deposition walls 25, which are partly formed by the outer wall of the cleaning device 11 at the same time, are provided in the cleaning chamber 15 of the cleaning device 11 according to FIG. 3. Supply means 27 which are connected to the supply for the cleaning liquid (not shown in more detail in FIG. 3) are provided on the upper edges 26 of the deposition walls. As outlined, the supply means 27 wet the deposition walls 25 with the cleaning liquid, so that said liquid flows down along the walls and is collected in the lower portion of the cleaning device at outlet 20. A film 28 of the cleaning liquid is formed in this process on the deposition walls 25, with the process gas sweeping along said film.

Figure 4:
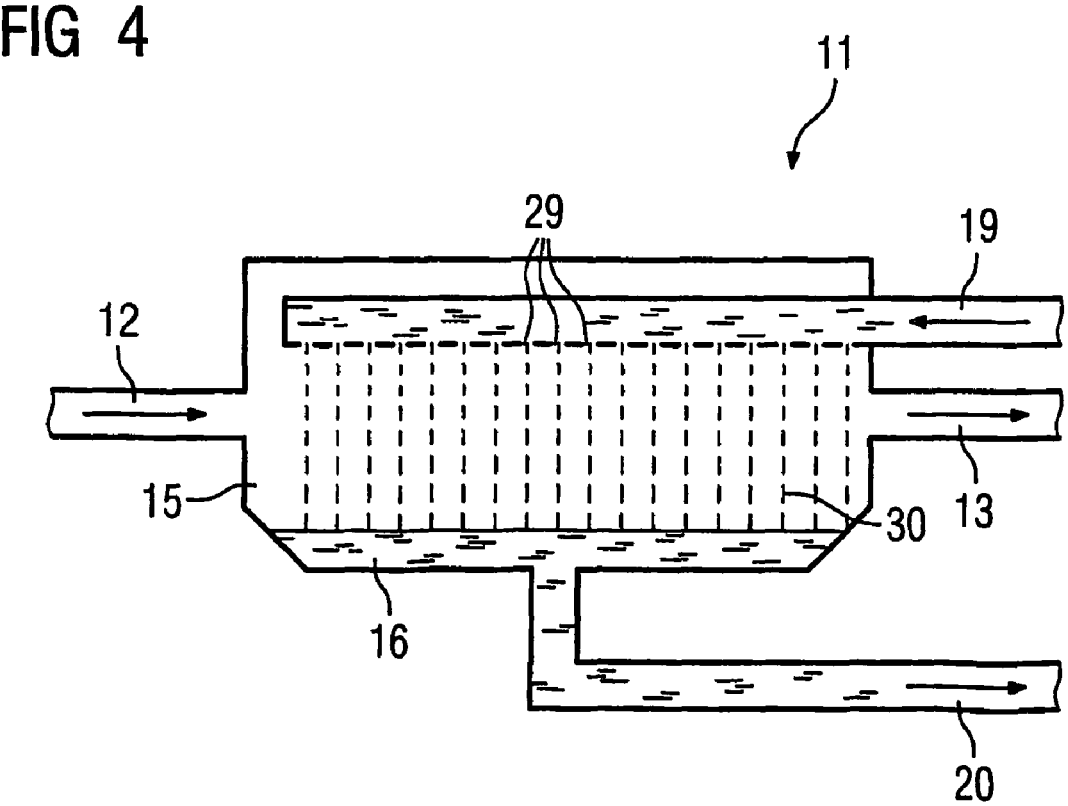

The cleaning device 11 shown in FIG. 4 is provided in the cleaning chamber 15 with a plurality of injection openings 29 which are connected to supply 19. The injection openings in their entirety produce a rain- or mist-like curtain 30 in the cleaning chamber 15, the process gas being passed through said curtain. The cleaning liquid is collected in the lower part of the cleaning chamber in the area of outlet 20.

Figure 5:
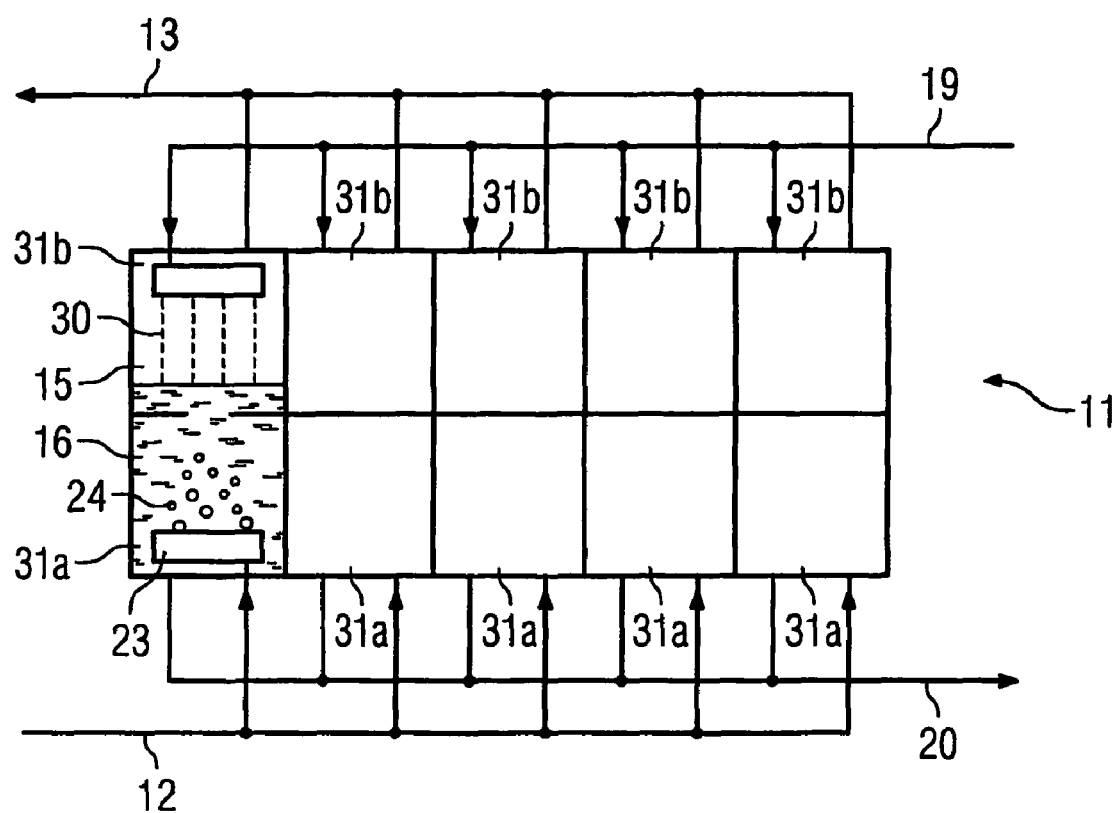
FIG. 5 is a schematic and partly cut-open illustration of an embodiment of the cleaning device according to the invention in a modular arrangement.

FIG. 5 shows a modular construction of the cleaning device 11 by way of example. Modules 31a, 31b are represented in a simplified manner as boxes, two of said boxes being cut open. As can be seen from the illustrated cut-open modules, two modules with different operative principles are series-connected each time. Modules 31a have a pre-cleaning function and employ the operative principle shown in FIG. 2. Modules 31b have a final cleaning function, the operative principle of FIG. 4 being here employed. Of course, any other desired combination of operative principles is possible.

The cleaning liquid is first supplied to modules 31b and then to modules 31a. Therefore, a cleaning liquid slightly subjected to impurities is first available for the final cleaning process, whereby the efficiency of the final cleaning process is improved. The cleaning liquid is subsequently used for the pre-cleaning process where a cleaning effect is possible due to the still high concentration of impurities in the process gas. As for the flow directions of cleaning liquid and process gas, the counter-current principle is thus realized according to FIG. 5. However, a co-current principle is just as well possible if this seems to be more appropriate for the specific case of application. Moreover, it is also possible to use different cleaning liquids in modules 31b and 31a for subjecting the process gas in successive order to different cleaning steps (not shown).

While the series-connection of the modules 31a and 31b improves the cleaning action of the cleaning device 11, the parallel arrangement of the respective module combination 31a, 31b aims at an enhancement of the possible throughput of process gas. As a consequence, the modular cleaning device 11 can be adapted to reflow soldering systems having different capacities.

The invention claimed is:

1. A cleaning device for process gases that is configured to generate clean process gas from contaminated process gas in a reflow soldering system, comprising:
    a cleaning chamber comprising first and second series-connected modules, configured to have different operative principles of deposition, which are connected one after the other in series,
    wherein the first series-connected module comprises,
        a cleaning liquid configured to clean the contaminated process gas, said cleaning chamber allowing the contaminated process gas to flow therein via a second series-connected module and allowing the cleaned process gas to flow therefrom via a discharge line;
        a first deposition wall having a first surface, the surface being configured to receive a film of the cleaning liquid and being configured to be an outer wall of the cleaning device; and
        a second deposition wall positioned centrally within the cleaning chamber and having a second surface facing the first surface, the second surface being configured to receive another film of the cleaning liquid; and
    wherein the second series-connected module comprises,
        a bath comprising the cleaning liquid, and
        a supply line coupled below a liquid level of the bath and configured to allow the contaminated process gas to flow therein and rise upwards in bubbles in the bath.

2. The device according to claim 1, wherein a flow path for the cleaning liquid extends through the series-connected modules in such a manner that the direction of flow of the cleaning liquid is opposite to the direction of flow of the process gas.

3. The cleaning device according to claim 1, wherein there are a plurality of the first and second deposition walls that are arranged perpendicular or with a slope with respect to each other in the cleaning chamber and a supply for the cleaning liquid is arranged in an area on top of edges of the plurality of first and second deposition walls.

4. The cleaning device according to claim 1, wherein at least one respective injection opening for the cleaning liquid is directed into the cleaning chamber.

5. The cleaning device according to claim 1, wherein the cleaning chamber comprises a respective outlet that is connected to a clarifying device for the cleaning liquid.

6. The cleaning device according to claim 1, wherein the cleaning device comprises a plurality of cleaning chambers arranged in parallel configured to allow for a predetermined throughput and, in successive order, to allow for a predetermined degree of purity for the process gas.

7. The cleaning device according to claim 6, further comprising a plurality of cleaning liquids having different cleaning properties, such that respective ones of which are provided in respective ones of the plurality of cleaning chambers arranged in the successive order.

8. A system, comprising:
    a cleaning chamber comprising first and second series-connected modules, configured to have different operative principles of deposition, which are connected one after the other in series,
    wherein the first series-connected module comprises,
        a plurality of separate deposition walls each having a surface, the surface being configured to receive a film of a cleaning liquid that is configured to clean a contaminated process gas, the contaminated process gas flowing into the plurality of separate deposition walls via a second series-connected module and from the plurality of separate deposition walls via a discharge line,
        wherein a supply for the cleaning liquid is arranged in an area on top of edges of the plurality of separate deposition walls,
        wherein at least one of the plurality of separate deposition walls is an inner surface of an outer wall of the system, and
        wherein a respective one of the plurality of separate deposition walls is centrally located within the system and has first and second surfaces, the first and second surfaces each being configured to receive another film of the cleaning liquid; and
    wherein the second series-connected module comprises,
        a bath comprising the cleaning liquid, and
        a supply line coupled below a liquid level of the bath and configured to allow the contaminated process gas to flow therein and rise upwards in bubbles in the bath.

9. The device according to claim 8, wherein a flow path for the cleaning liquid extends through the series-connected modules in such a manner that the direction of flow of the cleaning liquid is opposite to the direction of flow of the process gas.

10. The cleaning device according to claim 8, wherein the plurality of separate deposition walls are arranged perpendicular or with a slope with respect to each other.

11. The cleaning device according to claim 8, wherein at least one respective injection opening for the cleaning liquid is directed into the plurality of separate deposition walls.

12. The cleaning device according to claim 8, wherein the plurality of separate deposition walls comprises a respective outlet that is connected to a clarifying device for the cleaning liquid.

13. The system according to claim 8, wherein the system comprises a plurality of cleaning chambers arranged in parallel configured to allow for a predetermined throughput and, in successive order, to allow for a predetermined degree of purity for the process gas.

14. The cleaning device according to claim 13, further comprising a plurality of cleaning liquids having different cleaning properties, such that respective ones of which are provided in respective ones of each of the cleaning chambers arranged in the successive order.

15. A cleaning device for process gases that is configured to generate clean process gas from contaminated process gas in a reflow soldering system, comprising:
    a cleaning chamber configured to allow the contaminated process gas to flow therein via a supply line and the cleaned process gas to flow therefrom via a discharge line, the cleaning chamber comprising first and second series-connected modules, configured to have different operative principles of deposition, which are connected one after the other in series,
    wherein the first series-connected module comprises,
        at least one first deposition wall having a first surface, the surface being configured to receive a film of cleaning liquid and being configured to be an outer wall of the cleaning device;
        at least one second deposition wall positioned centrally within the cleaning chamber and having a second surface facing the first surface, the second surface being configured to receive another film of the cleaning liquid;
        a supply for the cleaning liquid arranged internally in the cleaning chamber in an upper area of the at least one first deposition wall and the at least one second deposition wall, configured to provide the films of cleaning liquid such that the films of cleaning liquid trap contaminants and flow downward along the at least one first deposition wall and the at least one second deposition wall, the supply for the cleaning liquid constantly replacing the films of cleaning liquid; and an outlet configured to collect the cleaning liquid and trapped contaminants at a lower area of the cleaning chamber; and wherein the second series-connected module comprises a bath comprising the cleaning liquid, and wherein the supply line is coupled below a liquid level of the bath and is configured to allow the contaminated process gas to flow therein and rise upwards in bubbles in the bath.

* * * * *